US012596562B2

(12) United States Patent
Zhang et al.

(10) Patent No.: US 12,596,562 B2
(45) Date of Patent: Apr. 7, 2026

(54) TECHNOLOGIES TO ALLOCATE RESOURCES TO START-UP A FUNCTION

(71) Applicant: Intel Corporation, Santa Clara, CA (US)

(72) Inventors: Hong Zhang, San Jose, CA (US); Adriaan D.M. Van De Ven, Portland, OR (US); Liping Lian, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 781 days.

(21) Appl. No.: 17/700,068

(22) Filed: Mar. 21, 2022

(65) Prior Publication Data

US 2022/0214908 A1     Jul. 7, 2022

(51) Int. Cl.
| | |
|---|---|
| *G06F 9/455* | (2018.01) |
| *G06F 9/30* | (2018.01) |
| *G06F 9/4401* | (2018.01) |
| *G06F 9/445* | (2018.01) |
| *G06F 9/48* | (2006.01) |

(52) U.S. Cl.
CPC ........ G06F 9/45558 (2013.01); G06F 9/3004 (2013.01); G06F 9/4403 (2013.01); G06F 9/44521 (2013.01); G06F 9/485 (2013.01); G06F 2009/45562 (2013.01); G06F 2009/45583 (2013.01)

(58) Field of Classification Search
None
See application file for complete search history.

(56) References Cited

U.S. PATENT DOCUMENTS

| | | | | |
|---|---|---|---|---|
| 8,972,350 | B2 * | 3/2015 | Bachar | G06F 16/178 |
| | | | | 707/638 |
| 10,742,491 | B2 * | 8/2020 | Shrivastava | G06F 9/44557 |
| 2011/0271290 | A1 * | 11/2011 | Bodin | G06F 9/44521 |
| | | | | 719/330 |
| 2018/0113623 | A1 * | 4/2018 | Sancheti | G06F 11/1451 |
| 2018/0239624 | A1 * | 8/2018 | Tsirkin | G06F 9/445 |
| 2019/0028335 | A1 * | 1/2019 | Shrivastava | G06F 9/5005 |
| 2020/0117470 | A1 * | 4/2020 | Vaikar | G06F 9/5055 |
| 2021/0165662 | A1 * | 6/2021 | Qiao | G06F 9/45558 |
| 2021/0211391 | A1 * | 7/2021 | Paraschiv | G06F 9/3877 |
| 2022/0027203 | A1 * | 1/2022 | Thoemmes | G06F 9/5055 |
| 2022/0308899 | A1 * | 9/2022 | Sun | G06F 9/44521 |

OTHER PUBLICATIONS

Bernheim, Sebastian et al., OPN402 "Firecracker open-source innovation", AWS re:Invent, © 2019, Amazon Web Services, 45 pages.
(Continued)

*Primary Examiner* — Abu Zar Ghaffari
(74) *Attorney, Agent, or Firm* — Compass IP Law PC

(57) ABSTRACT

Examples described herein relate to launching a function instance based on data related to a previously launched instance of the function and prior to receipt of a portion of the data. In some examples, the memory snapshot is taken during launch of the previously launched instance of the function. In some examples, the first code segments are loaded into memory of a runtime environment during the launch of the previously launched instance of the function in a life cycle execution of the previously launched instance of the function.

16 Claims, 7 Drawing Sheets

(56) References Cited

OTHER PUBLICATIONS

Mieden, Philipp and PARTARRIEU, Philippe, "Performance analysis of KVM-based microVMs orchestrated by Firecracker and QEMU", Security and Network Engineering, University of Amsterdam, The Netherlands, Dec. 22, 2019, 7 pages.

Stan's blog, "Using Firecracker and Go to run short-lived, untrusted code execution jobs", https://stanislas.blog/2021/08/firecracker/, Aug. 2021, 18 pages.

U.S. Appl. No. 17/700,068, Figure 1, Known Prior Art, Oct. 2021.

* cited by examiner time

Run the function

1. Download the whole function package from remote registry

2. Convert the function container image into a root filesystem on the host

3. Create a new execution environment (microVM)

4. Execute INIT code (launch language runtime, import function dependencies, set up configs)

5. Execute the function handler logic

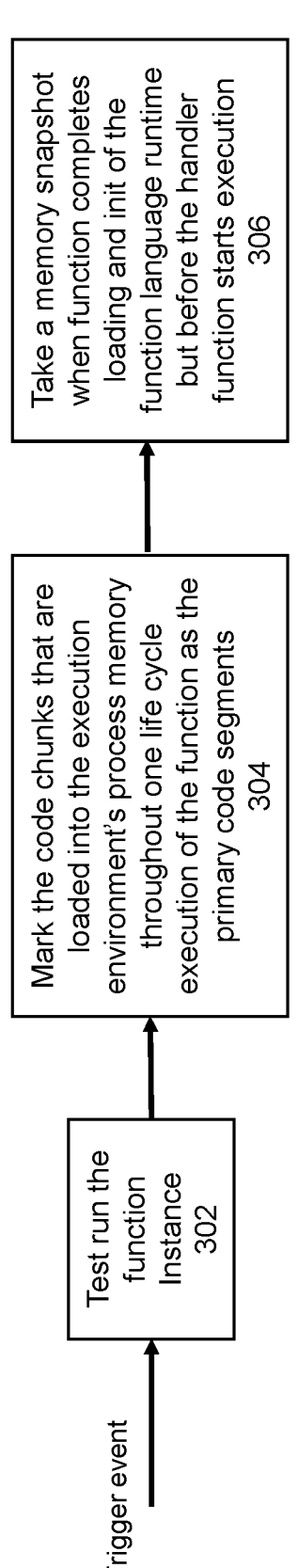

Trigger event

Test run the function Instance 302

Mark the code chunks that are loaded into the execution environment's process memory throughout one life cycle execution of the function as the primary code segments 304

Take a memory snapshot when function completes loading and init of the function language runtime but before the handler function starts execution 306

FIG. 3

ACCESS DATA RELATED TO PRIOR EXECUTED INSTANCE OF A FUNCTION
AND LOAD PRIMARY CODE SEGMENTS
502

LOAD DATA RELATED TO PRIOR EXECUTED INSTANCE OF A
FUNCTION AND LOAD PRIMARY CODE SEGMENTS FROM LOCAL OR
REMOTE MEMORY

LOAD PRIMARY CODE SEGMENTS IN SPECIFIED ORDER

LAUNCH FUNCTION INSTANCE ON PLATFORM
504

LOAD SECONDARY CODE SEGMENTS

TECHNOLOGIES TO ALLOCATE RESOURCES TO START-UP A FUNCTION

BACKGROUND

Function as a service (FaaS) is a cloud computing execution system in which the cloud provider configures an operating running environment on demand to execute the function code in response to a trigger event. A micro virtual machine (microVM) refers to an execution environment in which the function code executes. In some cases, the FaaS system creates the microVM in response to a trigger event and startup latency is incurred between the trigger event and a time at which the function code commences execution. This startup latency is referred-to as cold start latency.

BRIEF DESCRIPTION OF THE DRAWINGS

FIG. 3 depicts an example operations of a preparation phase for obtaining a memory snapshot and determining primary code segments.

DETAILED DESCRIPTION

Figure 1:
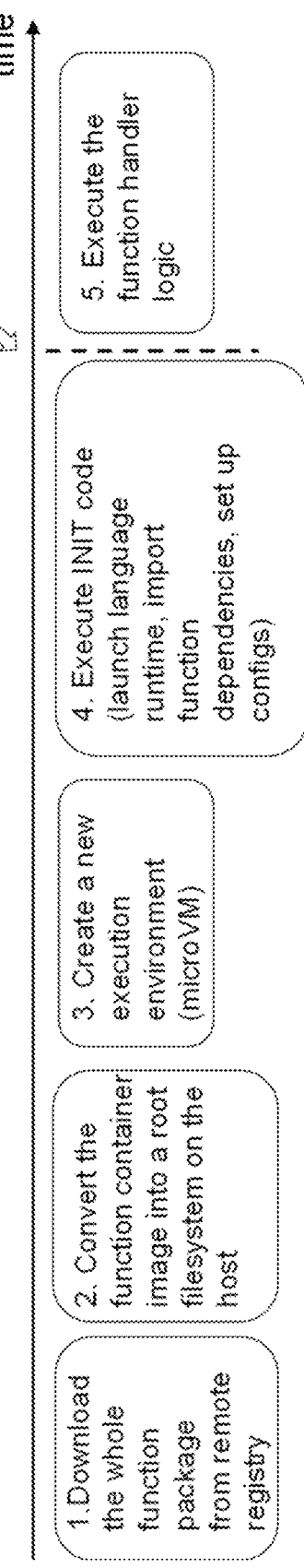
FIG. 1 depicts an example startup of a microVM.

FIG. 1 depicts an example prior art startup of a microVM. A cold start can include executing the following operations in sequence. In operation 1, an orchestrator causes a function container image from an external code registry to be copied to a host platform storage. In operation 2, the host platform converts the function container image into a root file system. The function container image can include container image metadata, the function code, the function's dependent libraries, the function language interpreter, and other code.

In operation 3, the orchestrator instantiates execution of a microVM on the host. The microVM can include a running environment for the function, based on the function container image metadata. The orchestrator can set up the microVM's network and security context, set up its resource boundary and isolation namespace, and mount the microVM to the localhost's root file system associated with the function. In operation 4, the orchestrator can load the function files from the host's root file system on the disk into the microVM's process memory. In operation 5, the host platform can cause the function to execute inside the microVM. Time taken to complete operations 1-5 can contribute to cold start startup latency and can increase latency to time of completion of the function.

At least to partially reduce a time to startup a function, function startup can include operations that are executed in parallel to create and execute a function within a microVM. Operations that are executed in parallel can include access to a memory snapshot of a prior execution of the function instance and loading of primary code segments. The function within a microVM can be launched after accessing the memory snapshot and the primary code segments. The function within the microVM can be deleted after the function completes execution. Deleting a microVM after the function completes execution can free computing, memory, and storage resources for other uses.

Examples described herein relate to attempting to reduce cold start time of a serverless function by starting a new function instance from its memory snapshot and primary code segments as well as performing, in parallel, a memory snapshot cloning operation and the primary code segments retrieving operation. Parallelizing execution of these operations can reduce the function cold start latency. A size of the memory snapshot and the primary code segments added together can be much smaller than a size of the original function code package, thereby reducing data retrieval and access times. Cloning a function language runtime environment from a memory snapshot can be faster than creating the function language runtime environment from an original function code package.

Figure 2:
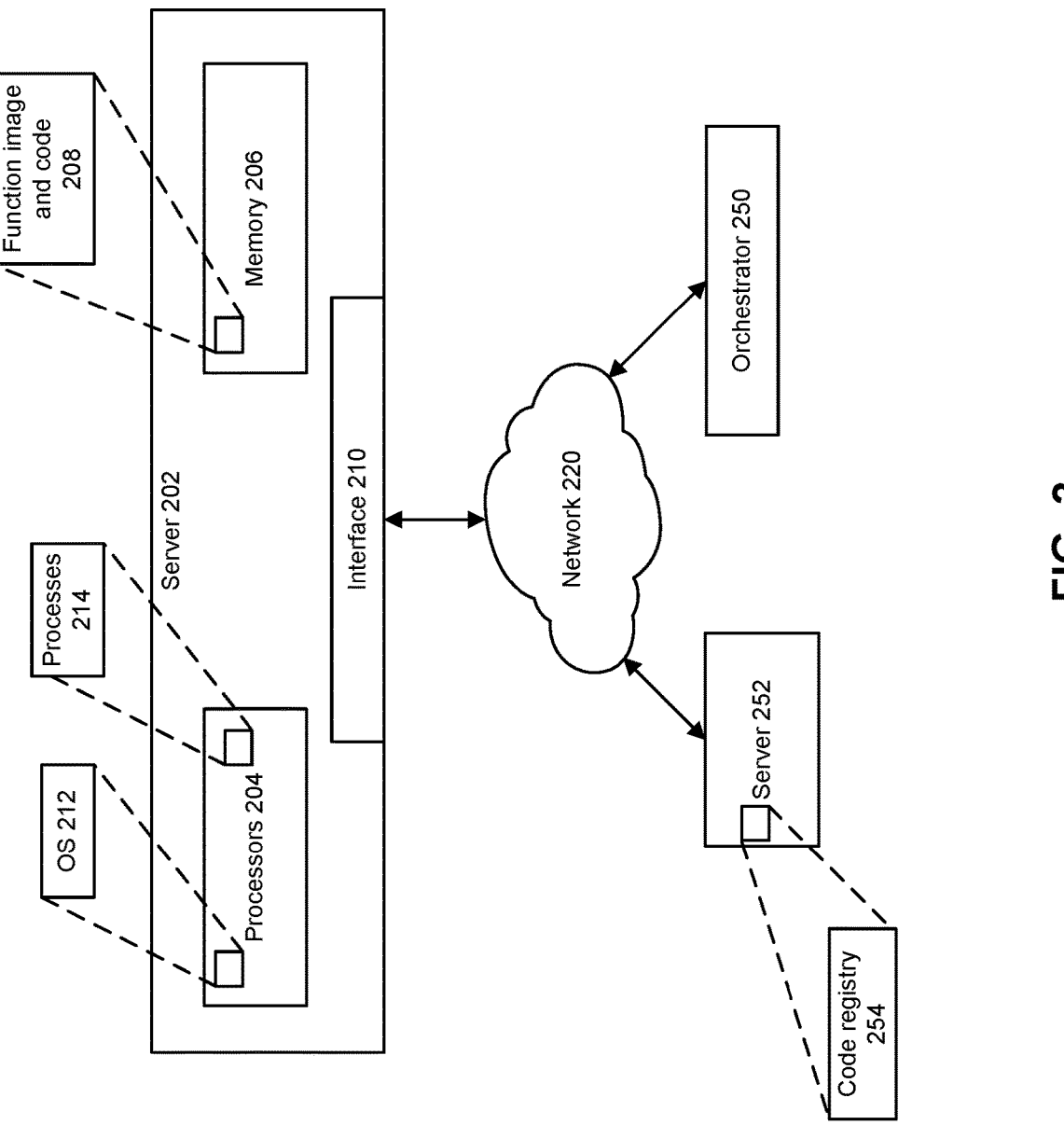
FIG. 2 depicts an example system in accordance with some examples.

FIG. 2 depicts an example system. Server 202 can include or access one or more processors 204, memory 206, and device interface 208, among other components described herein (e.g., accelerator devices, interconnects, and other circuitry). Various examples of processors 204 are described herein. Processors 204 can execute one or more processes 214 (e.g., functions, microservices, virtual machines (VMs), microVMs, containers, or other distributed or virtualized execution environments) that are launched as described herein.

A virtualized execution environment (VEE) can include at least a microVM, virtual machine, or a container. A microVM can be used to isolate an untrusted computing operation from a computer's host operating system. A microVM can execute in a server that runs a host operating system (OS). A microVM engine can access the OS and can provide an application programming interface (API), network, storage and management capabilities to operate microVMs. The micro VM engine can create isolated virtual instances that can run a guest OS and a workload. For example, microVMs can be created and managed by Linux Kernel-based Virtual Machine (KVM), QEMU, Amazon Web Services (AWS).

A virtual machine (VM) can be software that runs an operating system and one or more applications. A VM can be defined by specification, configuration files, virtual disk file, non-volatile random access memory (NVRAM) setting file, and the log file and is backed by the physical resources of a host computing platform. A VM can include an operating system (OS) or application environment that is installed on software, which imitates dedicated hardware. The end user has the same experience on a virtual machine as they would have on dedicated hardware. Specialized software, called a hypervisor, emulates the PC client or server's CPU, memory, hard disk, network and other hardware resources completely, enabling virtual machines to share the resources. The hypervisor can emulate multiple virtual hardware platforms that are isolated from another, allowing virtual machines to run Linux®, Windows® Server, VMware ESXi, and other operating systems on the same underlying physical host.

A container can be a software package of applications, configurations and dependencies so the applications run reliably on one computing environment to another. Containers can share an operating system installed on the server platform and run as isolated processes. A container can be a software package that contains everything the software needs to run such as system tools, libraries, and settings. Containers may be isolated from the other software and the operating system itself. The isolated nature of containers provides several benefits. First, the software in a container will run the same in different environments. For example, a container that includes PHP and MySQL can run identically on both a Linux® computer and a Windows® machine. Second, containers provide added security since the software will not affect the host operating system. While an installed application may alter system settings and modify resources, such as the Windows registry, a container can only modify settings within the container.

Various examples of processes 214 include an application composed of microservices, where a microservice runs in its own process and communicates using protocols (e.g., application program interface (API), a Hypertext Transfer Protocol (HTTP) resource API, message service, remote procedure calls (RPC), or Google RPC (gRPC)). Microservices can communicate with one another using a service mesh and be executed in one or more data centers or edge networks. Microservices can be independently deployed using centralized management of these services. The management system may be written in different programming languages and use different data storage technologies. A microservice can be characterized by one or more of: polyglot programming (e.g., code written in multiple languages to capture additional functionality and efficiency not available in a single language), or lightweight container or virtual machine deployment, and decentralized continuous microservice delivery.

Processes 214 can perform packet processing based on one or more of Data Plane Development Kit (DPDK), Storage Performance Development Kit (SPDK), OpenData-Plane, Network Function Virtualization (NFV), software-defined networking (SDN), Evolved Packet Core (EPC), or 5G network slicing. Some example implementations of NFV are described in ETSI specifications or Open Source NFV Management and orchestration (MANO) from ETSI's Open Source Mano (OSM) group. A virtual network function (VNF) can include a service chain or sequence of virtualized tasks executed on generic configurable hardware such as firewalls, domain name system (DNS), caching or network address translation (NAT) and can run in VEEs. VNFs can be linked together as a service chain. In some examples, EPC is a 3GPP-specified core architecture at least for Long Term Evolution (LTE) access. 5G network slicing can provide for multiplexing of virtualized and independent logical networks on the same physical network infrastructure. Some applications can perform video processing or media transcoding (e.g., changing the encoding of audio, image or video files).

In some examples, OS 212 can be consistent with Linux®, Windows® Server or personal computer, Free-BSD®, Android®, MacOS®, iOS®, VMware vSphere, openSUSE, RHEL, CentOS, Debian, Ubuntu, or any other operating system. OS 212 and driver can execute on a processor sold or designed by Intel®, ARM®, AMD®, Qualcomm®, IBM®, Nvidia®, Broadcom®, Texas Instruments®, among others.

Memory 206 can be implemented as a volatile memory device including a cache (e.g., Level 1 (L1), Level 2 (L2), Level 3 (L3), and/or last level cache (LLC)). Memory 206 can store function image and code 208 that can be used as a seed to launch a function instance, as described herein. For example, function image and code 208 can include primary code segments grouped into one or more code package or file (.pkg1) as well as secondary code segments grouped into a code package or file (.pkg2) as well as an order of launch or download of one or more primary code segments and one or more secondary code segments. As described herein, function image and code 208 can include a memory snapshot taken after completion of creating of the previously launched instance of the function's running environment and loading and initializing a language runtime of the previously launched instance of the function such as after completion of creating a sandbox, loading and initializing a language runtime, and optionally, import or load function dependencies, but before assignment of init function variables such as unique function identifiers (IDs), setting up a connection to other services or servers via a fabric or network, opening files, reading environment variables, and/or initiating the function handler. In some examples, function image and code 208 can include one or more executable binaries or device images to be executed by a field programmable gate array (FPGA) or configuration profiles of an application specific integrated circuit (ASIC).

Interface 210 can be used to communicate via network 220 with server 252 and/or orchestrator 250. Interface 210 can be implemented as one or more of: a network interface controller (NIC), a remote direct memory access (RDMA)-enabled NIC, SmartNIC, router, switch, forwarding element, infrastructure processing unit (IPU), data processing unit (DPU), or device interface. A device interface can be consistent with Peripheral Component Interconnect Express (PCIe), Compute Express Link (CXL), or other connection technologies. See, for example, Peripheral Component Interconnect Express (PCIe) Base Specification 1.0 (2002), as well as earlier versions, later versions, and variations thereof. See, for example, Compute Express Link (CXL) Specification revision 2.0, version 0.7 (2019), as well as earlier versions, later versions, and variations thereof.

In some examples, orchestrator 250 can request cold start of FaaS or functions for execution on server 202. Examples of orchestrator 250 include Amazon Lambda, Microsoft Azure function, Google CloudRun, Knative, Azure, or others. Orchestrator 250 can direct server 202 to execute a function based on memory snapshot and primary and secondary code loading scheme described herein. Code registry 254 can store function code used to create a prior running instance of the function. A function snapshot can be loaded from storage in code register 254 on server 252 to memory 206. In parallel, in a cold start operation, primary function code segments can be loaded from registry 254 from a hierarchical storage to memory 206. In a cold start operation, FaaS framework in OS 212 can launch the function instance from the memory snapshot and the primary code segments instead of launching a new function instance from an original function code package. Cold start latency for function startup can be reduced for example by accessing a clone of the function instance from a memory snapshot taken at least partially in parallel with downloading the function primary code segments in an ordered fashion. After download the primary code segments, the function handler can be launched to launch the function execution on server 202.

In some examples, disaggregated or composite servers can be formed from one or multiple servers to execute workloads of FaaS. Multi-tenant environments can be supported by the disaggregated or composite servers. Workloads from different tenants can be executed for different tenants. In some examples, a workload can include one or more operations to perform on behalf of process 214 or one or more operations of process 214.

FIG. 3 illustrates an example of operations of a preparation phase for obtaining a memory snapshot and determining primary code segments. A computing platform such as a server that performs the operations of the preparation phase can be a same or different server than that which executes the function within a VM or microVM. At 302, a function that is to be replicated can be launched for execution on a server. Launching a function can include a sequence of the following operations: creating a sandbox (e.g., VM or microVM), loading and initializing (init) a language runtime, importing or loading function dependencies, initializing function variables such as unique function identifiers (IDs), setting up a connection to other services or servers via a fabric or network, opening files, reading environment variables, and/or initiating the function handler. A sequence of loading and execution of primary code segments can be identified. In addition, secondary code segments can be identified as well as an order of loading and execution of secondary code segments. A memory page marking tool can be used to identify code segments of a function container image that are loaded prior to execution as well as an order of download of the primary code segments and/or secondary code segments. In some examples, a developer can annotate code segments as primary or secondary. Secondary code segments can be identified as code segments that, if not available for access during launch or execution of a function, would not cause a stall of the function. Primary function code segments can include source and/or binary machine-readable code written in one or more languages (e.g., Python, Go, Java, Node.JS). Secondary or non-primary function code segments can include source and/or binary machine-readable code written in one or more languages (e.g., Python, Go, Java, Node.JS).

At 304, one or more primary code segments that are loaded from storage to memory or cache in a life cycle execution of the function are identified and marked. At 306, a memory snapshot of the launched function can be taken after completion of creating a sandbox, loading and initializing a language runtime, and, optionally, importing or load function dependencies but before init function variables such as unique function identifiers (IDs), setting up a connection to other services or servers via a fabric or network, opening files, reading environment variables, and/or initiating the function handler. The memory snapshot can be stored in the server that launched the function or copied to another server such as memory pool or server that hosts and serves the memory snapshot of the launched function to one or more servers. In some cases, function instance specific unique ID generation and creation of a network connection to other services, and other data in memory for the function instance taken after completion of the import or load function dependencies operation may not be reusable for other instances of the function and can cause execution of other instance of the function instances run into error. The identified or marked primary code segments and the memory snapshot can be accessed to seed a launch of another instance of the function. In other words, the function can be cold started with created sandbox, loaded and initialized language runtime, and potentially imported or loaded function dependencies and with marked primary code segments.

Figure 4:
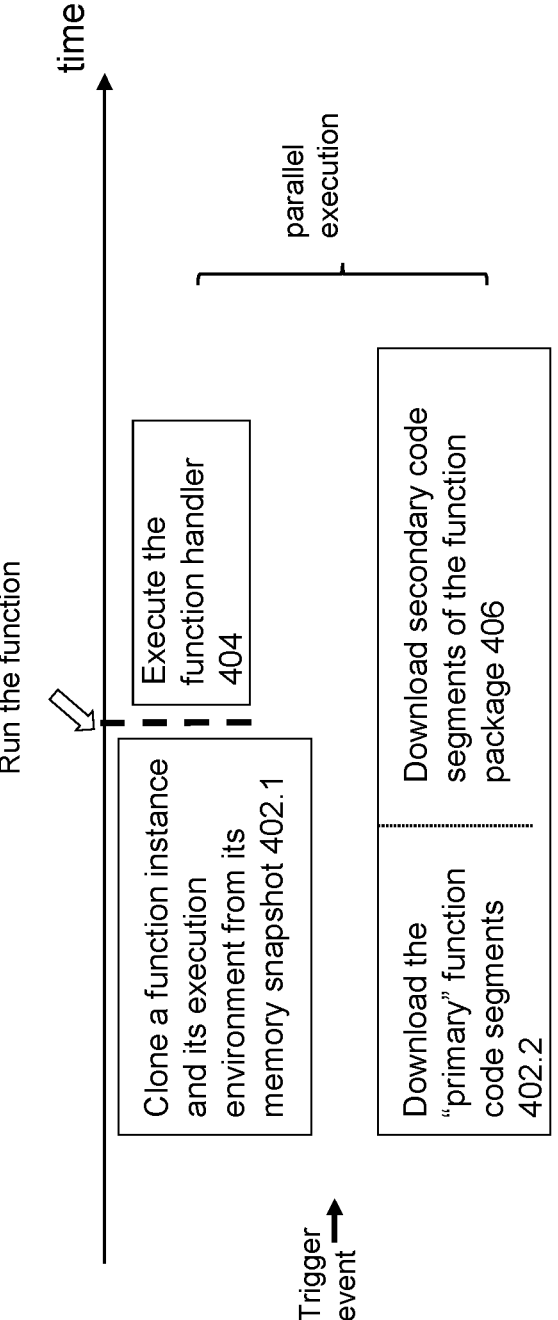
FIG. 4 depicts an example operations to launch a function.

FIG. 4 depicts an example process. In some examples, the process can be performed by a processor at the direction of an orchestrator, virtual machine manager, hypervisor, or other software. The orchestrator, virtual machine manager, or hypervisor can execute on a same or different server than that which launches a function. A trigger event such as a scheduled or requested execution of a function can lead to execution of the process. In operation 402.1, a previously generated function instance can be downloaded from a local or remote source and cloned to memory or cache in a new or another memory addressable region of memory. The previously generated or cloned function instance can include a memory snapshot of a previously launched function taken after completion of creating a sandbox, loading and initializing a language runtime, and potentially, importing or loading function dependencies but before init function variables such as unique function identifiers (IDs), setting up a connection to other services or servers via a fabric or network, opening files, reading environment variables, and/or initiating the function handler. The memory snapshot can include memory content of running function instance before the function starts to execute and can include context, data, and/or executable binary. In operation 402.1, uniqueness can be applied to the generated function instance. For example, one or more of the following function IDs can be associated with the generated function instance: an internet protocol (IP) address, security keys, random numbers, or other data.

Operation 402.2 can commence at or near a starting time of operation 402.1. Operations 402.1 and 402.2 can be performed at least partially overlapping in time. Operation 402.2 can include downloading or copying primary code segments associated with the previously generated function instance from a code registry to the server that is to execute the function. For example, primary code segments associated with the function can be identified in a prior launch of another instance of the function. After downloading primary code segments marked according to download or launch order, at operation 406, secondary code segments can be downloaded in identified order of launch. The memory image and primary and secondary code segments and their order of launch can be identified by a prior launch of the function.

At 404, a function handler can be executed to generate a function instance from memory image loaded in 402.1 and the primary code segments loaded in 402.2 to cause execution of a function instance. In some examples, execution of a function handler can be performed after completion of 402.1, completion of 402.2, or completion of both 402.1 and 402.2. Execution of a function instance can access primary code segments and secondary code segments from memory or storage. Example semantics of a function handler include AWS Lambda function exports.handler or Python handler.py, although others can be used.

Figure 5:
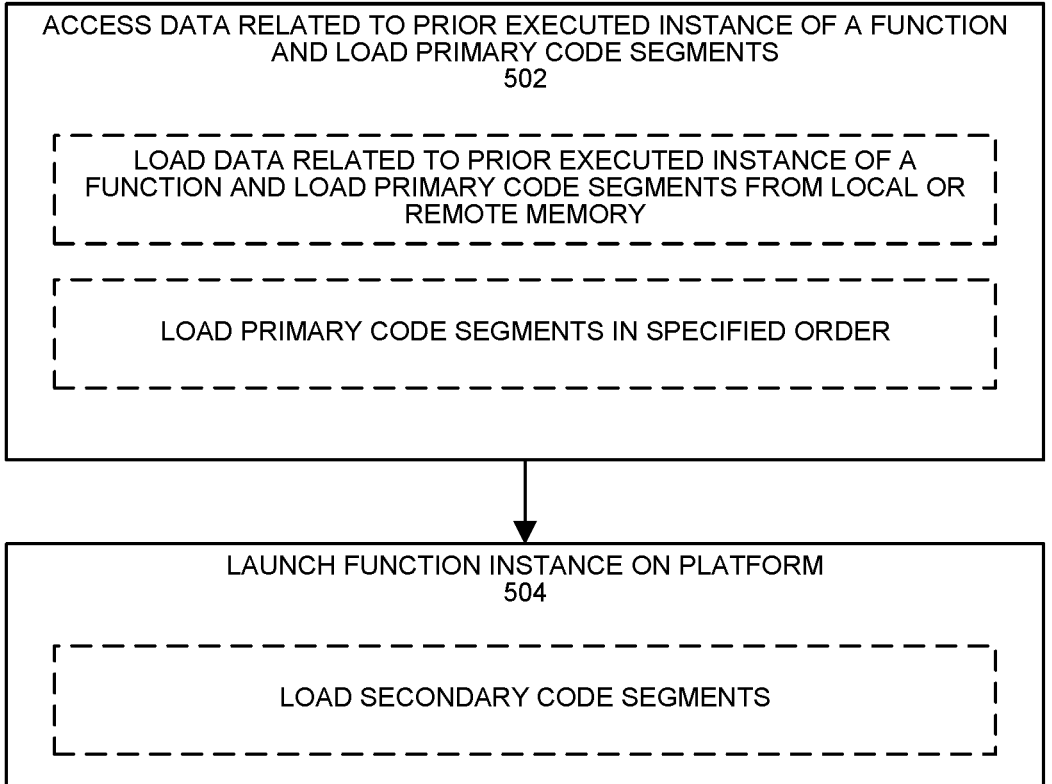
FIG. 5 depicts an example process to launch a function.

FIG. 5 depicts an example process. The process can be performed by a platform. At 502, in response to a request to launch a function, data related to a prior launch of the function instance and primary code segments can be retrieved and accessed. The data related to a prior launch of the function instance can include a memory snapshot of a previously launched instance of the function taken after completion of creating a sandbox, loading and initializing a language runtime, and, optionally, import or loading of function dependencies, but before initializing function variables such as unique function identifiers (IDs), setting up a connection to other services or servers via a fabric or network, opening files, reading environment variables, and/or initiating the function handler. The data related to a prior launch of the function instance and primary code segments can be accessed from a memory in the platform or from a memory in a remote (e.g., network attached) server. The data related to a prior launch of the function instance and primary code segments can be accessed may have been copied to the memory at the request of an orchestrator prior to triggering a function launch on the platform. The primary code segments can be accessed or loaded in an identified order of loading.

At 504, the function can be launched on the platform. For example, a routine handler can be initiated to launch the function based on the data related to a prior launch of the function instance and primary code segments. During or after the launch of the function, secondary code segments can be loaded onto the platform for access by the function. The secondary code segments can be identified from the prior launch of the function instance or by a developer, among other examples.

Figure 6:
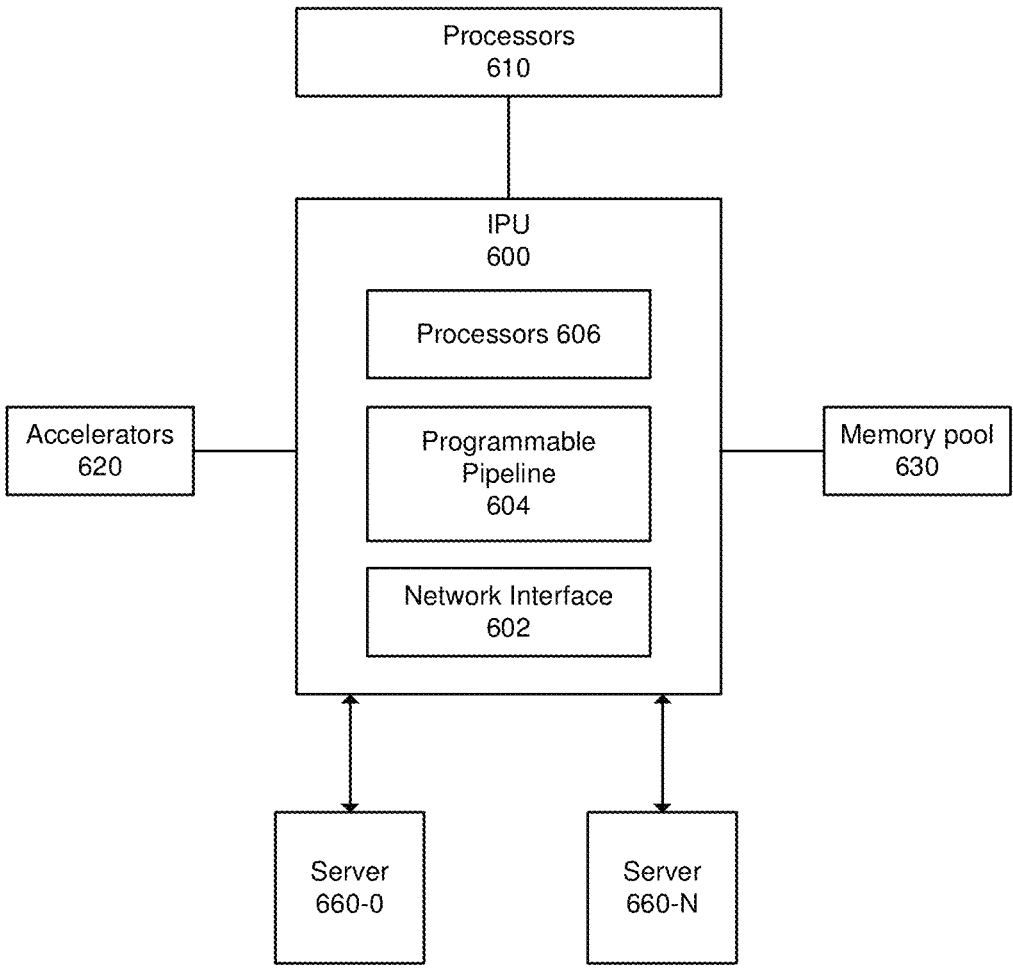
FIG. 6 depicts an example system of an infrastructure processing unit.

FIG. 6 depicts an example system. In this system, IPU 600 manages performance of one or more processes using one or more of processors 606, processors 610, accelerators 620, memory pool 630, or servers 640-0 to 640-N, where N is an integer of 1 or more. In some examples, processors 606 of IPU 600 can execute one or more processes, applications, VMs, containers, microservices, and so forth that request performance of workloads by one or more of: processors 610, accelerators 620, memory pool 630, and/or servers 640-0 to 640-N. IPU 600 can utilize network interface 602 or one or more device interfaces to communicate with processors 610, accelerators 620, memory pool 630, and/or servers 640-0 to 640-N. IPU 600 can utilize programmable pipeline 604 to process packets that are to be transmitted from network interface 602 or packets received from network interface 602. Programmable pipeline 604 and/or processors 606 can be configured to launch a function as part of a function chain or sequence of a FaaS based on a previously launched instance of the function, as described herein.

Figure 7:
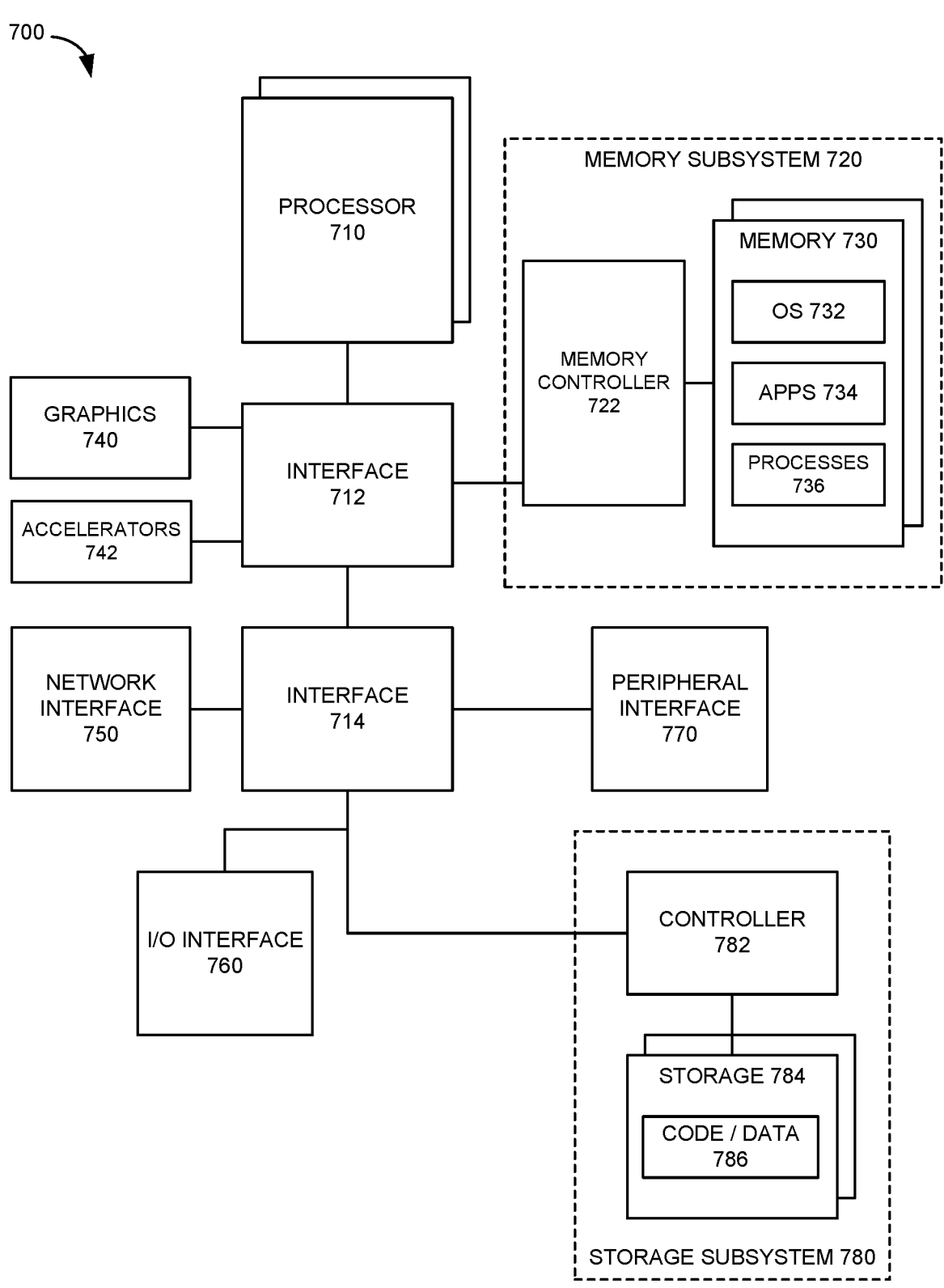
FIG. 7 depicts an example computing system.

FIG. 7 depicts an example computing system. System 700 can be configured to launch a function based on a previously launched instance of the function, as described herein. Processor 710 can include any type of microprocessor, central processing unit (CPU), graphics processing unit (GPU), processing core, or other processing hardware to provide processing for system 700, or a combination of processors. Processor 710 controls the overall operation of system 700, and can be or include, one or more programmable general-purpose or special-purpose microprocessors, digital signal processors (DSPs), programmable controllers, application specific integrated circuits (ASICs), programmable logic devices (PLDs), or the like, or a combination of such devices. In some examples, processor 710 can be configured to launch a function based on a previously launched instance of the function, as described herein.

In one example, system 700 includes interface 712 coupled to processor 710, which can represent a higher speed interface or a high throughput interface for system components that needs higher bandwidth connections, such as memory subsystem 720 or graphics interface components 740, or accelerators 742. Interface 712 represents an interface circuit, which can be a standalone component or integrated onto a processor die. Where present, graphics interface 740 interfaces to graphics components for providing a visual display to a user of system 700. In one example, graphics interface 740 can drive a display that provides an output to a user. In one example, graphics interface 740 generates a display based on data stored in memory 730 or based on operations executed by processor 710 or both. In one example, graphics interface 740 generates a display based on data stored in memory 730 or based on operations executed by processor 710 or both.

Accelerators 742 can be a fixed function or programmable offload engine that can be accessed or used by a processor 710. For example, an accelerator among accelerators 742 can provide compression (DC) capability, cryptography services such as public key encryption (PKE), cipher, hash/authentication capabilities, decryption, or other capabilities or services. In some embodiments, in addition or alternatively, an accelerator among accelerators 742 provides field select controller capabilities as described herein. In some cases, accelerators 742 can be integrated into a CPU socket (e.g., a connector to a motherboard or circuit board that includes a CPU and provides an electrical interface with the CPU). For example, accelerators 742 can include a single or multi-core processor, graphics processing unit, logical execution unit single or multi-level cache, functional units usable to independently execute programs or threads, application specific integrated circuits (ASICs), neural network processors (NNPs), programmable control logic, and programmable processing elements such as field programmable gate arrays (FPGAs) or programmable logic devices (PLDs). Accelerators 742 can provide multiple neural networks, CPUs, processor cores, general purpose graphics processing units, or graphics processing units can be made available for use by artificial intelligence (AI) or machine learning (ML) models. For example, the AI model can use or include one or more of: a reinforcement learning scheme, Q-learning scheme, deep-Q learning, or Asynchronous Advantage Actor-Critic (A3C), combinatorial neural network, recurrent combinatorial neural network, or other AI or ML model. Multiple neural networks, processor cores, or graphics processing units can be made available for use by AI or ML models.

Memory subsystem 720 represents the main memory of system 700 and provides storage for code to be executed by processor 710, or data values to be used in executing a routine. Memory subsystem 720 can include one or more memory devices 730 such as read-only memory (ROM), flash memory, one or more varieties of random access memory (RAM) such as DRAM, or other memory devices, or a combination of such devices. Memory 730 stores and hosts, among other things, operating system (OS) 732 to provide a software platform for execution of instructions in system 700. Additionally, applications 734 can execute on the software platform of OS 732 from memory 730. Applications 734 represent programs that have their own operational logic to perform execution of one or more functions. Processes 736 represent agents or routines that provide auxiliary functions to OS 732 or one or more applications 734 or a combination. OS 732, applications 734, and processes 736 provide software logic to provide functions for system 700. In one example, memory subsystem 720 includes memory controller 722, which is a memory controller to generate and issue commands to memory 730. It will be understood that memory controller 722 could be a physical part of processor 710 or a physical part of interface 712. For example, memory controller 722 can be an integrated memory controller, integrated onto a circuit with processor 710.

In some examples, OS 732 can be Linux®, Windows® Server or personal computer, FreeBSD®, Android®, MacOS®, iOS®, VMware vSphere, openSUSE, RHEL, CentOS, Debian, Ubuntu, or any other operating system. The OS and driver can execute on a CPU sold or designed by Intel®, ARM®, AMD®, Qualcomm®, Broadcom®, Nvidia®, IBM®, Texas Instruments®, among others.

While not specifically illustrated, it will be understood that system 700 can include one or more buses or bus systems between devices, such as a memory bus, a graphics bus, interface buses, or others. Buses or other signal lines can communicatively or electrically couple components together, or both communicatively and electrically couple the components. Buses can include physical communication lines, point-to-point connections, bridges, adapters, controllers, or other circuitry or a combination. Buses can include, for example, one or more of a system bus, a Peripheral Component Interconnect (PCI) bus, a Hyper Transport or industry standard architecture (ISA) bus, a small computer system interface (SCSI) bus, a universal serial bus (USB), or an Institute of Electrical and Electronics Engineers (IEEE) standard 1394 bus (Firewire).

In one example, system 700 includes interface 714, which can be coupled to interface 712. In one example, interface 714 represents an interface circuit, which can include stand-alone components and integrated circuitry. In one example, multiple user interface components or peripheral components, or both, couple to interface 714. Network interface 750 provides system 700 the ability to communicate with remote devices (e.g., servers or other computing devices) over one or more networks. Network interface 750 can include an Ethernet adapter, wireless interconnection components, cellular network interconnection components, USB (universal serial bus), or other wired or wireless standards-based or proprietary interfaces. Network interface 750 can transmit data to a device that is in the same data center or rack or a remote device, which can include sending data stored in memory. Network interface 750 can execute a virtual switch to provide virtual machine-to-virtual machine communications for virtual machines (or other VEEs) in a same server or among different servers.

Some examples of network interface 750 are part of an Infrastructure Processing Unit (IPU) or data processing unit (DPU) or utilized by an IPU or DPU. An xPU can refer at least to an IPU, DPU, GPU, GPGPU, or other processing units (e.g., accelerator devices). An IPU or DPU can include a network interface with one or more programmable pipelines or fixed function processors to perform offload of operations that could have been performed by a CPU. The IPU or DPU can include one or more memory devices. In some examples, the IPU or DPU can perform virtual switch operations, manage storage transactions (e.g., compression, cryptography, virtualization), and manage operations performed on other IPUs, DPUs, servers, or devices.

βNetwork interface 750 can include a programmable pipeline or processors which can be programmed using Programming Protocol-independent Packet Processors (P4), C, Python, Broadcom Network Programming Language (NPL), NVIDIA® CUDA®, NVIDIA® DOCA™ or x86 compatible executable binaries or other executable binaries.

In one example, system 700 includes one or more input/output (I/O) interface(s) 760. I/O interface 760 can include one or more interface components through which a user interacts with system 700 (e.g., audio, alphanumeric, tactile/touch, or other interfacing). Peripheral interface 770 can include any hardware interface not specifically mentioned above. Peripherals refer generally to devices that connect dependently to system 700. A dependent connection is one where system 700 provides the software platform or hardware platform or both on which operation executes, and with which a user interacts.

In one example, system 700 includes storage subsystem 780 to store data in a nonvolatile manner. In one example, in certain system implementations, at least certain components of storage 780 can overlap with components of memory subsystem 720. Storage subsystem 780 includes storage device(s) 784, which can be or include any conventional medium for storing large amounts of data in a non-volatile manner, such as one or more magnetic, solid state, or optical based disks, or a combination. Storage 784 holds code or instructions and data 786 in a persistent state (e.g., the value is retained despite interruption of power to system 700). Storage 784 can be generically considered to be a "memory," although memory 730 is typically the executing or operating memory to provide instructions to processor 710. Whereas storage 784 is nonvolatile, memory 730 can include volatile memory (e.g., the value or state of the data is indeterminate if power is interrupted to system 700). In one example, storage subsystem 780 includes controller 782 to interface with storage 784. In one example controller 782 is a physical part of interface 714 or processor 710 or can include circuits or logic in both processor 710 and interface 714.

A volatile memory is memory whose state (and therefore the data stored in it) is indeterminate if power is interrupted to the device. Dynamic volatile memory requires refreshing the data stored in the device to maintain state. One example of dynamic volatile memory incudes DRAM (Dynamic Random Access Memory), or some variant such as Synchronous DRAM (SDRAM). Another example of volatile memory includes cache or static random access memory (SRAM). A memory subsystem as described herein may be compatible with a number of memory technologies, such as standards released by JEDEC (Joint Electronic Device Engineering Council)).

A non-volatile memory (NVM) device is a memory whose state is determinate even if power is interrupted to the device. In some examples, the NVM device can comprise a block addressable memory device, such as NAND technologies, or more specifically, multi-threshold level NAND flash memory (for example, Single-Level Cell ("SLC"), Multi-Level Cell ("MLC"), Quad-Level Cell ("QLC"), Tri-Level Cell ("TLC"), or some other NAND). A NVM device can also comprise a byte-addressable write-in-place three dimensional cross point memory device, or other byte addressable write-in-place NVM device (also referred to as persistent memory), such as single or multi-level Phase Change Memory (PCM) or phase change memory with a switch (PCMS), Intel® Optane™ memory, NVM devices that use chalcogenide phase change material (for example, chalcogenide glass), or other memory.

A power source (not depicted) provides power to the components of system 700. More specifically, power source typically interfaces to one or multiple power supplies in system 700 to provide power to the components of system 700. In one example, the power supply includes an AC to DC (alternating current to direct current) adapter to plug into a wall outlet. Such AC power can be renewable energy (e.g., solar power) power source. In one example, power source includes a DC power source, such as an external AC to DC converter. In one example, power source or power supply includes wireless charging hardware to charge via proximity to a charging field. In one example, power source can include an internal battery, alternating current supply, motion-based power supply, solar power supply, or fuel cell source.

In an example, system 700 can be implemented using interconnected compute sleds of processors, memories, storages, network interfaces, and other components. High speed interconnects can be used such as: Ethernet (IEEE 802.3), remote direct memory access (RDMA), InfiniBand, Internet Wide Area RDMA Protocol (iWARP), Transmission Control Protocol (TCP), User Datagram Protocol (UDP), quick UDP Internet Connections (QUIC), RDMA over Converged Ethernet (RoCE), Peripheral Component Interconnect express (PCIe), Intel QuickPath Interconnect (QPI), Intel Ultra Path Interconnect (UPI), Intel On-Chip System Fabric (IOSF), Omni-Path, Compute Express Link (CXL), HyperTransport, high-speed fabric, NVLink, Advanced Microcontroller Bus Architecture (AMBA) interconnect, OpenCAPI, Gen-Z, Infinity Fabric (IF), Cache Coherent Interconnect for Accelerators (COX), 3GPP Long Term Evolution (LTE) (4G), 3GPP 5G, and variations thereof. Data can be copied or stored to virtualized storage nodes or accessed using a protocol such as NVMe over Fabrics (NVMe-oF) or NVMe.

Embodiments herein may be implemented in various types of computing, smart phones, tablets, personal computers, and networking equipment, such as switches, routers, racks, and blade servers such as those employed in a data center and/or server farm environment. The servers used in data centers and server farms comprise arrayed server configurations such as rack-based servers or blade servers. These servers are interconnected in communication via various network provisions, such as partitioning sets of servers into Local Area Networks (LANs) with appropriate switching and routing facilities between the LANs to form a private Intranet. For example, cloud hosting facilities may typically employ large data centers with a multitude of servers. A blade comprises a separate computing platform that is configured to perform server-type functions, that is, a "server on a card." Accordingly, each blade includes components common to conventional servers, including a main printed circuit board (main board) providing internal wiring (e.g., buses) for coupling appropriate integrated circuits (ICs) and other components mounted to the board.

In some examples, network interface and other embodiments described herein can be used in connection with a base station (e.g., 3G, 4G, 5G and so forth), macro base station (e.g., 5G networks), picostation (e.g., an IEEE 802.11 compatible access point), nano station (e.g., for Point-to-MultiPoint (PtMP) applications), on-premises data centers, off-premises data centers, edge network elements, fog network elements, and/or hybrid data centers (e.g., data center that use virtualization, cloud and software-defined networking to deliver application workloads across physical data centers and distributed multi-cloud environments).

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASICs, PLDs, DSPs, FPGAs, memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, APIs, instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation. A processor can be one or more combination of a hardware state machine, digital control logic, central processing unit, or any hardware, firmware and/or software elements.

Some examples may be implemented using or as an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that actually make the logic or processor.

The appearances of the phrase "one example" or "an example" are not necessarily all referring to the same example or embodiment. Any aspect described herein can be combined with any other aspect or similar aspect described herein, regardless of whether the aspects are described with respect to the same figure or element. Division, omission or inclusion of block functions depicted in the accompanying figures does not infer that the hardware components, circuits, software and/or elements for implementing these functions would necessarily be divided, omitted, or included in embodiments.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

The terms "first," "second," and the like, herein do not denote any order, quantity, or importance, but rather are used to distinguish one element from another. The terms "a" and "an" herein do not denote a limitation of quantity, but rather denote the presence of at least one of the referenced items. The term "asserted" used herein with reference to a signal denote a state of the signal, in which the signal is active, and which can be achieved by applying any logic level either logic 0 or logic 1 to the signal. The terms "follow" or "after" can refer to immediately following or following after some other event or events. Other sequences of operations may also be performed according to alternative embodiments. Furthermore, additional operations may be added or removed depending on the particular applications. Any combination of changes can be used and one of ordinary skill in the art with the benefit of this disclosure would understand the many variations, modifications, and alternative embodiments thereof.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or any combination thereof, including "X, Y, and/or Z."

Illustrative examples of the devices, systems, and methods disclosed herein are provided below. An embodiment of the devices, systems, and methods may include any one or more, and any combination of, the examples described below.

Example 1 includes one or more examples, and includes a non-transitory computer-readable medium comprising instructions stored thereon, that if executed by one or more processors, cause the one or more processors to: launch a function instance based on data related to a previously launched instance of the function and prior to receipt of a portion of the data.

Example 2 includes one or more examples, wherein the data comprises: a memory snapshot taken during launch of the previously launched instance of the function and first code segments that are loaded into memory of a runtime environment during the launch of the previously launched instance of the function in a life cycle execution of the previously launched instance of the function.

Example 3 includes one or more examples, wherein the launch a function instance based on data related to a previously launched instance of the function and prior to receipt of a portion of the data comprises: at least partially in parallel: clone the memory snapshot and receive the first code segments into memory.

Example 4 includes one or more examples, wherein the memory snapshot comprises a memory snapshot captured after completion of creating the previously launched instance of the function's running environment and loading and initializing a language runtime of the previously launched instance of the function.

Example 5 includes one or more examples, comprising instructions stored thereon, that if executed by one or more processors, cause the one or more processors to: execute a function handler based on availability of the memory snapshot and the first code segments.

Example 6 includes one or more examples, wherein the launch a function instance based on data related to a previously launched instance of the function and prior to receipt of a portion of the data comprises: associate the launched function instance with one or more unique identifiers (IDs).

Example 7 includes one or more examples, comprising instructions stored thereon, that if executed by one or more processors, cause the one or more processors to: after retrieval of the first code segments, retrieve second code segments associated with the function instance.

Example 8 includes one or more examples, wherein the launched function instance comprises a microVM.

Example 9 includes one or more examples, and includes an apparatus comprising: at least one processor; at least one memory comprising instructions stored thereon, that if executed by the at least one processor, cause the at least one processor to: launch a function instance based on data related to a previously launched instance of the function and prior to receipt of a portion of the data.

Example 10 includes one or more examples, wherein the data comprises: a memory snapshot taken during launch of the previously launched instance of the function and first code segments that are loaded into memory of a runtime environment during the launch of the previously launched instance of the function in a life cycle execution of the previously launched instance of the function.

Example 11 includes one or more examples, wherein the launch a function instance based on data related to a previously launched instance of the function and prior to receipt of a portion of the data comprises: at least partially in parallel: clone the memory snapshot and receive the first code segments into memory.

Example 12 includes one or more examples, wherein the memory snapshot comprises a memory snapshot captured after completion of creating of the previously launched instance of the function's running environment and loading and initializing a language runtime of the previously launched instance of the function.

Example 13 includes one or more examples, wherein the at least one memory comprises instructions stored thereon, that if executed by the at least one processor, cause the at least one processor to: execute a function handler based on availability of the memory snapshot and the first code segments.

Example 14 includes one or more examples, wherein to launch a function instance based on data related to a previously launched instance of the function and prior to receipt of a portion of the data, the one or more processors are to: associate the launched function instance with one or more unique identifiers (IDs).

Example 15 includes one or more examples, wherein the at least one memory comprises instructions stored thereon, that if executed by the at least one processor, cause the at least one processor to: after retrieval of the first code segments, retrieve second code segments associated with the function instance.

Example 16 includes one or more examples, comprising a server, wherein the server comprises the at least one processor, the at least one memory, and a network interface device and wherein the network interface device is to receive the data and store the data into the at least one memory.

Example 17 includes one or more examples, comprising a datacenter, wherein the datacenter comprises a second server, wherein the second server is to store the data.

Example 18 includes one or more examples, and includes a method comprising: launching a function instance based on data related to a previously launched instance of the function and prior to receipt of a portion of the data.

Example 19 includes one or more examples, wherein the data comprises: a memory snapshot taken during launch of the previously launched instance of the function and first code segments that are loaded into memory of a runtime environment during the launch of the previously launched instance of the function in a life cycle execution of the previously launched instance of the function.

Example 20 includes one or more examples, wherein the launching a function instance based on data related to a previously launched instance of the function and prior to receipt of a portion of the data comprises: at least partially in parallel: cloning the memory snapshot and receiving the first code segments into memory.

What is claimed is:

1. At least one non-transitory computer-readable medium comprising instructions stored thereon, that if executed by one or more processors, cause the one or more processors to:

launch a function instance by:

retrieving data related to a previously launched instance of the function, wherein the data comprises a memory snapshot taken during launch of the previously launched instance of the function and the data comprises first code segments loaded into a runtime environment during a launch of the previously launched instance of the function, after retrieval of copies of the first code segments, retrieve second code segments associated with the function instance and access the retrieved first code segments and retrieved second code segments, and while retrieving the second code segments, execute a function handler to launch the function instance based on the memory snapshot and the first code segments and retrieved code segments of the second code segments, wherein:

the memory snapshot comprises memory content of the previously launched instance of the function after completion of creating a sandbox but before initiation of a function handler for the previously launched instance of the function, the first and second code segments are different parts of the function instance.

2. The computer-readable medium of claim 1, wherein the launching the function instance based on data related to the previously launched instance of the function and prior to receipt of a portion of the data comprises:

at least partially in parallel:

clone the memory snapshot, and receive the first code segments into a memory device.

3. The computer-readable medium of claim 1, wherein the memory snapshot was captured after completion of creating the previously launched instance of the function's running environment and loading and initializing a language runtime of the previously launched instance of the function.

4. The computer-readable medium of claim 1, comprising instructions stored thereon, that if executed by one or more processors, cause the one or more processors to:

launch the function instance by executing a function handler based on availability of the memory snapshot and the first code segments.

5. The computer-readable medium of claim 1, wherein the launch the function instance based on the data related to the previously launched instance of the function and prior to receipt of a portion of the data comprises:

associate the launched function instance with one or more unique identifiers (IDs).

6. The computer-readable medium of claim 1, wherein the launched function instance comprises a micro virtual machine.

7. The computer-readable medium of claim 1, comprising instructions stored thereon, that if executed by one or more processors, cause the one or more processors to:

delete the function instance after completion of execution of the function instance.

8. An apparatus comprising:

at least one processor;

at least one memory comprising instructions stored thereon, that if executed by the at least one processor, cause the at least one processor to:

launch a function instance by:

retrieval of data related to a previously launched instance of the function, wherein the data comprises a memory snapshot taken during launch of the previously launched instance of the function and the data comprises first code segments loaded into a runtime environment during a launch of the previously launched instance of the function, after retrieval of copies of the first code segments, retrieve second code segments associated with the function instance and access the retrieved first code segments and retrieved second code segments, and during retrieval the second code segments, execute a function handler to launch the function instance based on the memory snapshot and the first code segments and retrieved code segments of the second code segments, wherein:

the memory snapshot comprises memory content of the previously launched instance of the function after completion of creating a sandbox but before initiation of a function handler for the previously launched instance of the function, the first and second code segments are different parts of the function instance.

9. The apparatus of claim 8, wherein the launch of the function instance based on data related to the previously launched instance of the function and prior to receipt of a portion of the data comprises:

at least partially in parallel:

clone the memory snapshot, and receive the first code segments into a memory device.

10. The apparatus of claim 8, wherein the memory snapshot was captured after completion of creating of the previously launched instance of the function's running environment and loading and initializing a language runtime of the previously launched instance of the function.

11. The apparatus of claim 8, wherein the at least one memory comprises instructions stored thereon, that if executed by the at least one processor, cause the at least one processor to:

launch the function by execution of a function handler based on availability of the memory snapshot and the first code segments.

12. The apparatus of claim 8, wherein to launch the function instance based on data related to the previously launched instance of the function and prior to receipt of a portion of the data, the at least one processor is to:

associate the launched function instance with one or more unique identifiers (IDs).

13. The apparatus of claim 8, comprising a server, wherein the server comprises the at least one processor, the at least one memory, and a network interface device and wherein the network interface device is to receive the data and store the data into the at least one memory.

14. The apparatus of claim 13, comprising a datacenter, wherein the datacenter comprises a second server, wherein the second server is to store the data.

15. A method comprising:

launch a function instance by:

retrieving data related to a previously launched instance of the function, wherein the data comprises a memory snapshot taken during launch of the previously launched instance of the function and the data comprises first code segments loaded into a runtime environment during a launch of the previously launched instance of the function, after retrieval of copies of the first code segments, retrieving second code segments associated with the function instance and accessing the retrieved first code segments and retrieved second code segments, and during retrieval the second code segments, execute a function handler to launch the function instance based on the memory snapshot and the first code segments and retrieved code segments of the second code segments, wherein:

the memory snapshot comprises memory content of the previously launched instance of the function after completion of creating a sandbox but before initiation of a function handler for the previously launched instance of the function, the first and second code segments are different parts of the function instance.

16. The method of claim 15, wherein the launching the function instance based on data related to the previously launched instance of the function and prior to receipt of a portion of the data comprises:

at least partially in parallel:

cloning the memory snapshot, and receiving the first code segments into memory.

* * * * *